UNITED STATES PATENT OFFICE.

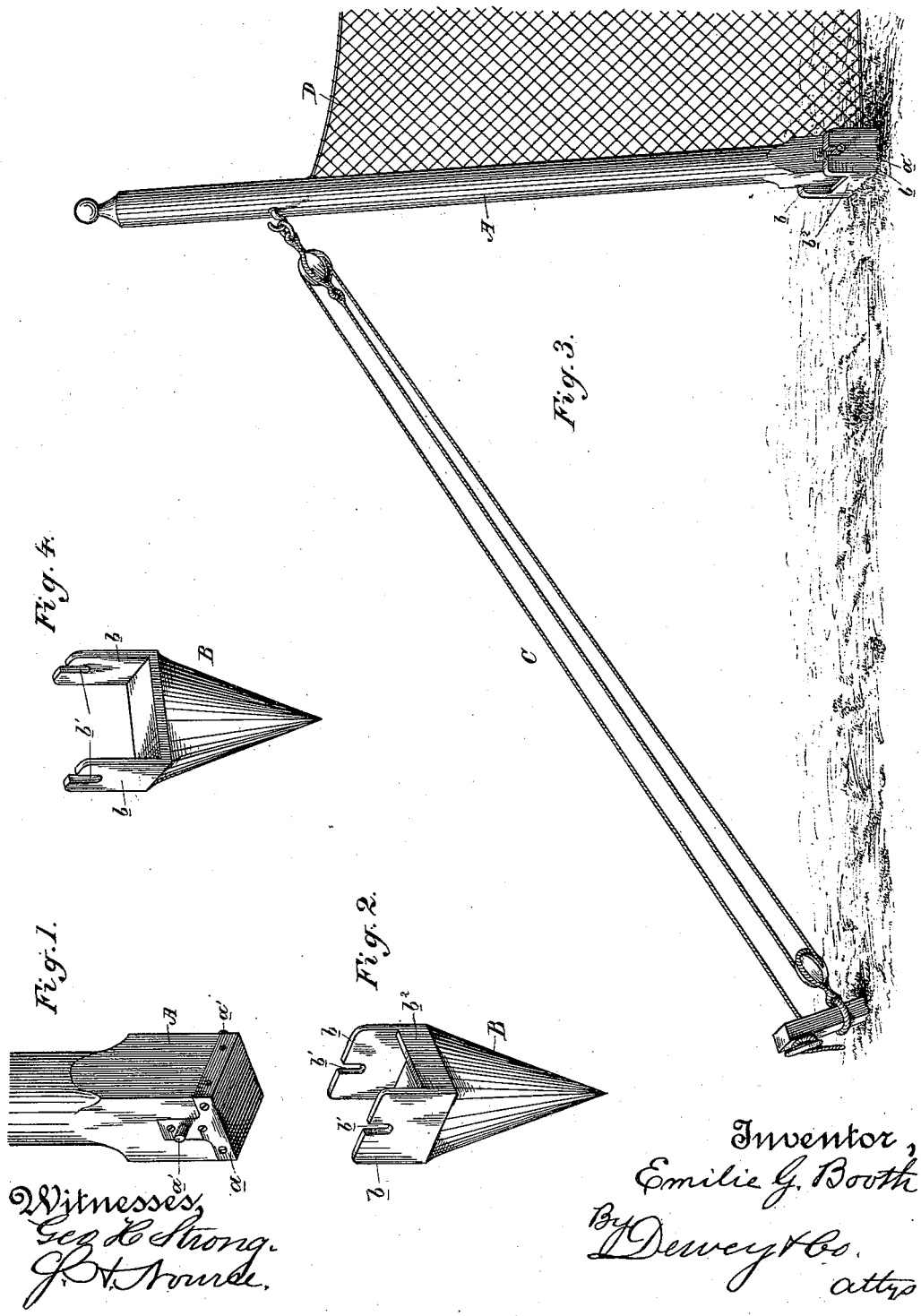

EMILIE G. BOOTH, OF BERKELEY, CALIFORNIA.

LAWN-TENNIS-NET POLE.

SPECIFICATION forming part of Letters Patent No. 353,050, dated November 23, 1886.

Application filed August 14, 1886. Serial No. 210,957. (No model.)

*To all whom it may concern:*

Be it known that I, EMILIE G. BOOTH, of Berkeley, Alameda county, and State of California, have invented an Improvement in Lawn-Tennis-Net Poles; and I hereby declare the following to be a full, clear, and exact description thereof.

My invention relates to the class of lawn-tennis apparatus, and especially to the poles by which the net is supported.

My invention consists, essentially, in a pole having a point united thereto by a pivot or hinge connection.

My invention further consists in a pole having on its base a plate or casting with short side pins or lugs, and a point having flanges on its top adapted to receive the base of the pole, and provided with suitable seats or bearings for the pins or lugs, whereby the pole is pivoted to the point, and may, by means of suitable guys, be adjusted for the purpose of tightening the net.

It consists, also, in minor details of construction, all of which I shall hereinafter fully describe.

The object of my invention is to provide a means for readily and effectively tightening the net.

The game of lawn-tennis is played upon a level surface, either turf or bare smooth ground, marked off according to given rules, and known as the "court." Along the transverse center of the court is stretched a net, the ends of which are supported by poles, and this net must be so arranged that its sagging center shall be at a given height from the ground. This adjustment is necessarily a frequent one, because of the practice of removing the net, or at least loosening it, when not in use, and it is essential, therefore, that some convenient means for tightening be employed. Where poles are used which are permanently planted, a simple block-and-tackle arrangement, attached to the net and adjustably hooked to one of the poles, may be employed with advantage; but it is usual also to remove the poles as well as the net, and in this case it is apparent such a device is not practicable, because of the necessarily insecure planting of the poles unless a permanent and deep socket in the ground be used, though this plan is open to the objection of having the socket fill up with dirt and trash. Consequently, where removable poles are used, it is customary to sharpen their points and insert them in the ground but a short distance, (only sufficient to get a bearing,) and then, by means of guys, to draw them back at an inclination, thereby tightening the net. This plan enables the dealer in lawn-tennis apparatus to furnish complete sets, the poles being included, and such sets require of the purchaser no other preparation than the mere setting up.

My invention, while being of this complete character, not only overcomes the disadvantages of other plans for tightening the net, but also obviates the plain objection to the sharpened and guyed poles—namely, their insecure foot-hold and tendency to break—by providing a durable, readily movable and adjustable pole, which, when in place, is secure and presentable, and which may be furnished complete by the trade.

Referring to the accompanying drawings for a more complete explanation of my invention, Figure 1 is a perspective view of the base of the pole, showing the casting fitted to it. Fig. 2 is a perspective view of the point. Fig. 3 is a perspective view showing the pole set up and holding the net taut. Fig. 4 is a perspective view showing the point modified by the omission of the back bar or stop.

A is the pole. B is the point, made independent of the pole, and adapted to be driven into the ground. The pole, as shown in Fig. 3, is pivoted to the point, so that by means of the guys or block and tackle C it may be drawn back in order to tighten the net D, which is attached to the pole.

As far as concerns the essential principle of my invention, the separable point and the pivot-connection between it and the pole may be made in any suitable manner; but I prefer the following construction: The point B is a casting, having at the top the flanges $b$, provided with the slots $b'$, and with a back bar or stop, $b^2$. The bottom of the pole has fitted and secured to it a plate or casting, $a$, on the sides of which are the short pivots or pins $a'$.

The pole is easily dropped to its place, the pins $a'$ bearing in the slots $b'$ and forming pivots, on which, by means of the block and tackle C, the pole is turned to such an inclination as is required for the tightening of the net.

The back bar, $b^2$, acts as stop to prevent the net by its weight from drawing the pole inwardly beyond a perpendicular; but, as shown in Fig. 4, this bar is not essential, and its omission will provide for cases where, for the sake of appearances, it is desired to have the poles perpendicular, even when tightened up, for by placing the poles far enough apart to cause them to incline toward each other when the net is loose they may be drawn up to a perpendicular to tighten it.

It is intended that the points B shall remain in position and only the poles and net be removed. The upper ends of the points, being but little above the surface of the ground, are not in the way, and being of an open character they will not fill up with dirt or trash, but will be always ready to receive the poles.

The castings are inexpensive, and by painting them they will present a good appearance. The poles thus constructed will add to the completeness of the set furnished the purchaser.

Having thus described my invention, what I claim as new, and desire to secure by Letters Patent, is—

1. A lawn-tennis-net pole having a point for entering the ground pivoted to its lower end, whereby the pole may be moved on its point to tighten the net, substantially as described.

2. The combination of a pole, an independent point for entering the ground, and a pivot-connection between the upper end of the point and the lower end of the pole, the whole forming an adjustable pole for supporting and tightening lawn-tennis nets, substantially as described.

3. A lawn-tennis-net pole having an independent separable point for entering the ground, and a pivot-connection between the point and pole, by which the latter may be readily applied to and removed from the point, substantially as described.

4. The combination of the lawn-tennis-net pole A, having pivot-pins at its lower end, with the point B for entering the ground, and having the flanges $b$, with bearings for the reception of the pivot-pins of the pole, substantially as described.

5. The lawn-tennis-net pole A, having on its lower end the plate or casting $a$, provided with pins or lugs $a'$, in combination with the point B for entering the ground, and having the flanges $b$, with bearings or slots $b'$ for the pins or lugs $a'$, whereby the pole is pivoted in the point, substantially as described.

6. The lawn-tennis-net pole A, having on its lower end pivot-pins, in combination with the point B, having the flanges $b$, with bearings for the reception of the pivot-pins of the pole, and the back bar or stop, $b^2$, substantially as described.

7. The lawn-tennis-net pole A, having on its lower end the plate or casting $a$, provided with pins or lugs $a'$, in combination with the point B, having the flanges $b$, with bearings or slots $b'$ for the reception of the pins or lugs $a'$, and the back bar or stop, $b^2$, substantially as described.

8. In lawn-tennis apparatus, the combination of a pole having a point pivoted to its lower end for entering the ground, a net secured to said pole, and ropes or guys, by which the pole may be turned on its point to tighten the net, substantially as described.

9. In lawn-tennis apparatus, the combination of the pole A, having pivot-pins $a'$, the separable point B, having flanges $b$, with bearings for receiving the pins $a'$, whereby the pole is pivoted to the point, the net D, secured to the pole, and the block and tackle C, by which the pole is adjusted and secured to tighten and hold the net, substantially as described.

In witness whereof I have hereunto set my hand.

EMILIE G. BOOTH.

Witnesses:
C. D. COLE,
J. H. BLOOD.